(12) United States Patent
Conheady et al.

(10) Patent No.: US 6,535,281 B2
(45) Date of Patent: Mar. 18, 2003

(54) METHOD AND APPARATUS FOR OPTICALLY SCANNING A VEHICLE WHEEL

(75) Inventors: Paul Conheady, Tulla (IE); John Brennan, Carrigrohane (IE); Helen Lowe, Ballysadare (IE)

(73) Assignee: Snap-On Deutschland Holding GmbH, Mettmann (DE)

( * ) Notice: Subject to any disclaimer, the term of this patent is extended or adjusted under 35 U.S.C. 154(b) by 0 days.

(21) Appl. No.: 09/909,217

(22) Filed: Jul. 19, 2001

(65) Prior Publication Data

US 2002/0018218 A1 Feb. 14, 2002

(30) Foreign Application Priority Data

Jul. 19, 2000 (DE) .......................... 100 35 118

(51) Int. Cl.$^7$ .......................... G01B 11/26; G01C 17/38; G01M 1/16
(52) U.S. Cl. .................... 356/139.09; 356/155; 702/95; 73/462
(58) Field of Search ........................ 356/139.09, 155, 356/139.04; 702/95; 73/462

(56) References Cited

U.S. PATENT DOCUMENTS 6,151,562 A * 11/2000 Merrill ........................ 702/95
6,244,108 B1 * 6/2001 McInnes et al. ............ 73/462

* cited by examiner

*Primary Examiner*—Georgia Epps
*Assistant Examiner*—Timothy J Thompson
(74) *Attorney, Agent, or Firm*—Shook, Hardy & Bacon L.L.P.

(57) ABSTRACT

A method and an apparatus for scanning a vehicle wheel, wherein a location on the wheel is sensed by means of a light beam emitted by a light source and is reflected to a position-sensitive receiver. The spacing of the sensed location relative to a reference location is measured from the directions of the emitted beam and the reflected beam. The light source and the position-sensitive receiver are synchronously pivoted about a common axis by means of a rotary drive including a stepping motor for successive measurement steps. A rotary angle sensor supplies signals proportional to the rotary position of the stepping motor to an evaluation system.

20 Claims, 4 Drawing Sheets

METHOD AND APPARATUS FOR OPTICALLY SCANNING A VEHICLE WHEEL

FIELD OF THE INVENTION

The present invention concerns a method and an apparatus for optically scanning a vehicle wheel.

A typical example of a vehicle wheel to which the invention can be applied can be a motor vehicle wheel.

BACKGROUND OF THE INVENTION

In one form of a method of optically scanning a vehicle wheel such as a motor vehicle wheel, a location on the wheel is sensed by means of a light beam emitted by a light source, and the light beam is reflected to a position-sensitive receiver. The spacing of the sensed location relative to a reference location is then measured from the directions of the emitted and reflected beams. That method can be carried into effect by suitable apparatus which comprises for example a shaft on which a vehicle wheel to be measured is rotatable about the axis thereof, with a light source for directing a light beam on to the location on the wheel and a position-sensitive receiver for receiving the reflected beam. A suitable actuator causes synchronous pivotal movement of the light source and the receiver about a common pivot axis, and the measurement values of the receiver are fed to an electronic evaluation system to ascertain the spacing of the location on the vehicle wheel from a reference location. Such a method and apparatus can be found in WO 98/10261. The light source can be in the form of a laser beam source and the location on the wheel, to which the light beam is directed, can be beside a balancing weight which is fixed on the inside of the vehicle wheel rim. The position of the sensed location on the wheel is ascertained by means of a suitable triangulation method.

In the apparatus structure, the light source and the receiver can be disposed on a common carrier which can be turned by hand so that the emitted light beam can be directed to the desired position at which the balancing weight is fixed on the wheel rim. The apparatus also includes a stepping motor with which, after an unbalance-measuring operation has been carried out on the vehicle wheel to be balanced, the light source alone is turned in such a way that the light beam emitted thereby is directed on to the balancing location on the wheel rim, at which the balancing operation is to be carried out, for example by fixing a balancing weight thereto.

Reference may also be made to WO 96/078830 disclosing a method and apparatus for balancing a motor vehicle wheel, in which a contour of the wheel and in particular the internal contour of the wheel rim can be ascertained by means of a scanning device. The optimum positions and sizes for balancing weights can then be ascertained from that sensed contour, in conjunction with measurement values from a device for measuring unbalance of the vehicle wheel.

SUMMARY OF THE INVENTION

An object of the present invention is to provide a method of optically scanning a vehicle wheel such as a motor vehicle wheel, with which complex wheel contour configurations such as inclined edges, rounded configurations and the like can be easily detected.

Another object of the present invention is to provide a method of optically scanning a motor vehicle wheel which involves an operating procedure of enhanced simplicity while affording reliable results.

Still another object of the present invention is to provide an apparatus for optically scanning a vehicle wheel to be balanced, which can implement accurate results while involving an uncomplicated apparatus structure.

Yet another object of the present invention is to provide an apparatus for optically scanning a vehicle wheel in which demands in terms of accuracy of the operating components of the apparatus can be readily met.

In accordance with the principles of the present invention in the method aspect the foregoing and other objects are attained by a method of optically scanning a vehicle wheel such as a motor vehicle wheel, in which a location on the wheel is sensed by means of a light beam emitted by a light source and the light is reflected to a position-sensitive receiver. The spacing of the sensed location on the wheel relative to a reference location is measured from the directions of the emitted beam and the beam reflected from the sensed location on the wheel. The emitted beam and the position-sensitive receiver are synchronously pivoted about a common axis in a measurement plane which intersects the rim surface of the vehicle wheel at an obtuse or approximately right angle, for successive measurement steps.

In the apparatus aspect the foregoing and other objects of the invention are attained by an apparatus for optically scanning a vehicle wheel to be balanced, comprising a shaft for carrying the wheel for rotation thereof about its axis, a light source for emitting a light beam on to a location on the wheel, and a position-sensitive receiver for receiving the light beam reflected from the sensed location on the wheel. A rotary drive produces synchronous pivotal movement of the light source and the receiver about a common pivot axis and an electronic evaluation system evaluates measurement values from the receiver for ascertaining the spacing of the sensed location on the vehicle wheel from a reference location. The rotary drive includes a stepping motor. A rotary angle sensor which supplies a signal proportional to the respective rotary angle position of the stepping motor is operatively connected to the evaluation system.

As will be seen in greater detail from the description hereinafter of a preferred embodiment of the invention, when the light beam emitted by the light source which more particularly can be in the form of a laser and the position-sensitive receiver which receives the beam reflected from the sensed location on the vehicle wheel are pivoted synchronously about a common axis for successive measurement steps, in a measurement plane which is substantially perpendicular through the rim surface of the vehicle wheel, in the successive measurement steps the respective spacings of the successively sensed locations on the wheel are measured in relation to a reference location which is stationary on the balancing machine on which the unbalance-measuring procedure and the balancing operation are carried out. Preferably, the respective spacings of the sensed locations on the vehicle wheel relative to the reference location are measured from the respective directions of the emitted light beam and the reflected light beam, on the basis of a one-dimensional active triangulation method. That provides for clearly determining the position of the respective sensed location on the vehicle wheel, relative to the reference location which is fixed with respect to the machine. The plurality of mutually adjoining, sensed and measured locations on the wheel can be used to very accurately ascertain the contour of the vehicle wheel and in particular the inside contour thereof.

As noted above, the sensing movement is produced by a stepping motor forming the rotary drive of the apparatus, for pivoting the light source and the receiver synchronously about the above-mentioned common pivot axis. For that purpose, the light source and the receiver can be fixed on a common carrier which is pivotable about the pivot axis.

The rotary angle sensor of the apparatus, which can be integrated into the stepping motor or which can be arranged separately, is used to detect the respective rotary angle position of the stepping motor and thus also the light source and the receiver. That rotary angle position is passed to the evaluation system together with the measurement signals from the receiver. It will be noted that the pivot axis about which the light source and the receiver are pivoted in operation of the apparatus is in a fixedly predetermined position with respect to the above-mentioned reference location which can be provided on the balancing machine, in fixed relationship with the machine.

In a preferred feature of the invention, the measurement plane within which the light source and the receiver and thus the emitted and the reflected light beam are moved extends at least substantially parallel to the axis of the wheel. When the axis of the wheel is arranged horizontally the measurement plane can extend below the axis of the wheel. It is however also possible for the measurement plane to extend inclinedly relative to the horizontal and to extend for example radially in relation to the axis of the wheel or the measurement shaft of the apparatus, on which the wheel is mounted.

In accordance with a further preferred feature of the method of the invention the emitted light beam can further be used to sense the radially extending region of the central part of the vehicle wheel within the rim thereof. In that case, it is possible to sense or ascertain angular positions of the base points of arms or spokes which extend radially from a central part of the wheel disk. Those measurement values can then be used for positioning balancing weights behind the appropriate arm or spoke, in an operating procedure as is to be found for example in U.S. Pat. No. 5,591,909 to which reference is accordingly directed.

Preferably, the pivot angle for the common pivotal movement of the light source and the receiver about the pivot axis is such that, starting from approximately the center of the wheel, the sensing emitted light beam and the reflected beam component received by the receiver from the sensed location on the wheel can be pivoted over the radially extending region of the disk portion of the wheel, the inside surface of the rim of the vehicle wheel and the tire bead.

In a further preferred feature of the method of the invention, lateral displacement, in the axial direction of the wheel, of the sensed locations of the wheel can be appropriately ascertained by means of the method.

After the procedure for measuring unbalance of the respective vehicle wheel, the emitted light beam can be directed on to the wheel at the balancing location at which unbalance compensation is to be effected, using the procedure known for example from WO 98/10261.

Further objects, features and advantages of the invention will be apparent from the description hereinafter of a preferred embodiment.

DESCRIPTION OF THE PREFERRED EMBODIMENT

Figure 1:
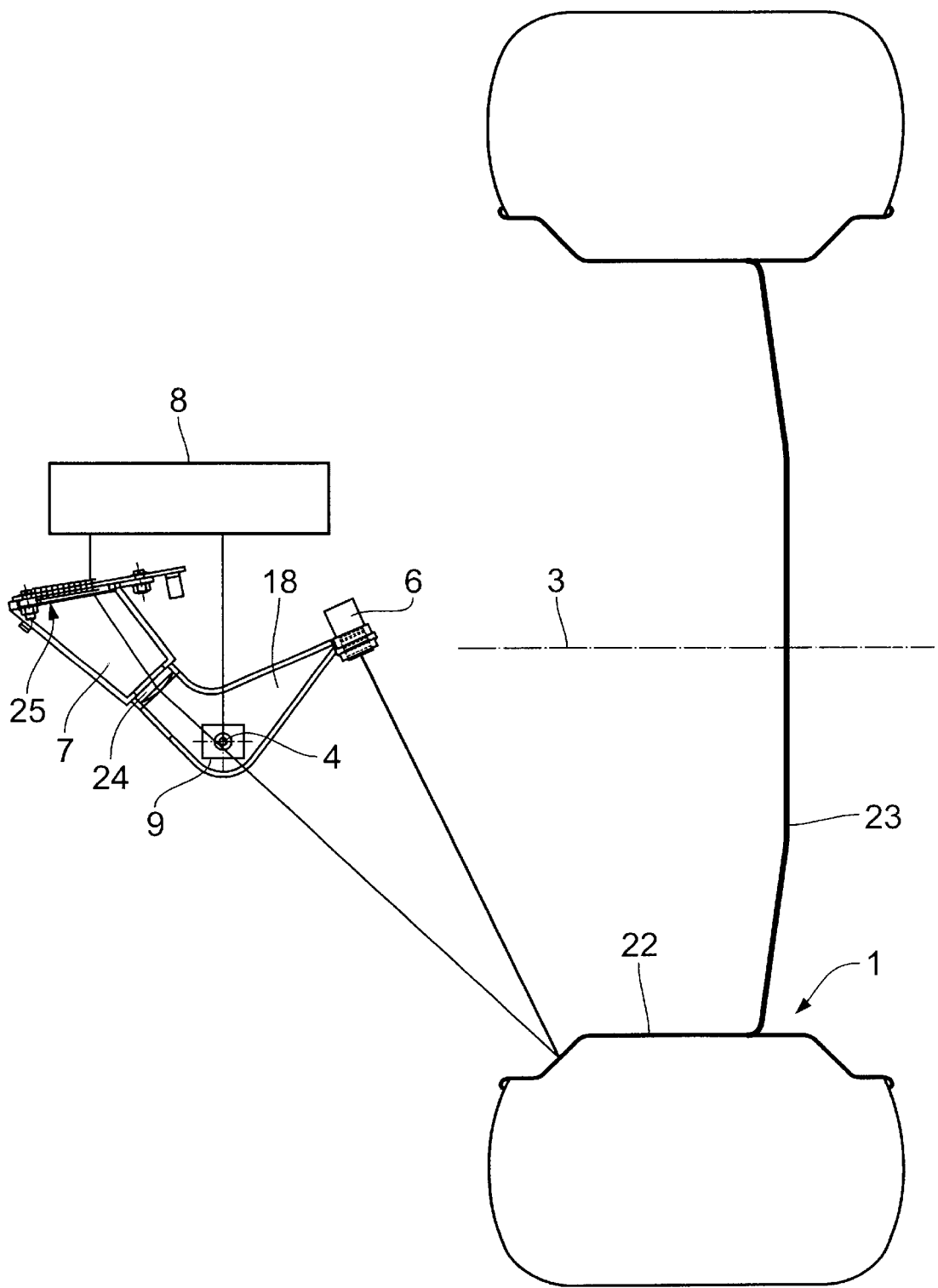
FIG. 1 shows a plan view of an embodiment of a scanning apparatus for optically scanning a motor vehicle wheel to be balanced.

Referring firstly to FIG. 1, shown therein as a diagrammatic view is an embodiment of an apparatus according to the invention for optically scanning a motor vehicle wheel 1 to be balanced, the wheel 1 comprising a radially extending wheel disk portion 23 and a rim 22.

The apparatus includes a light source 6 for emitting a light beam, for example a laser light source, and a position-sensitive receiver 7. The light source 6 and the receiver 7 are arranged on a common carrier 18. The common carrier 18 can be in the form of an angle lever as illustrated, with the light source 6 and the receiver 7 being disposed at the respective ends thereof. The carrier 18 and the light source 6 and receiver 7 which are mounted thereto are supported pivotably about a common pivot axis 4.

Figure 2:
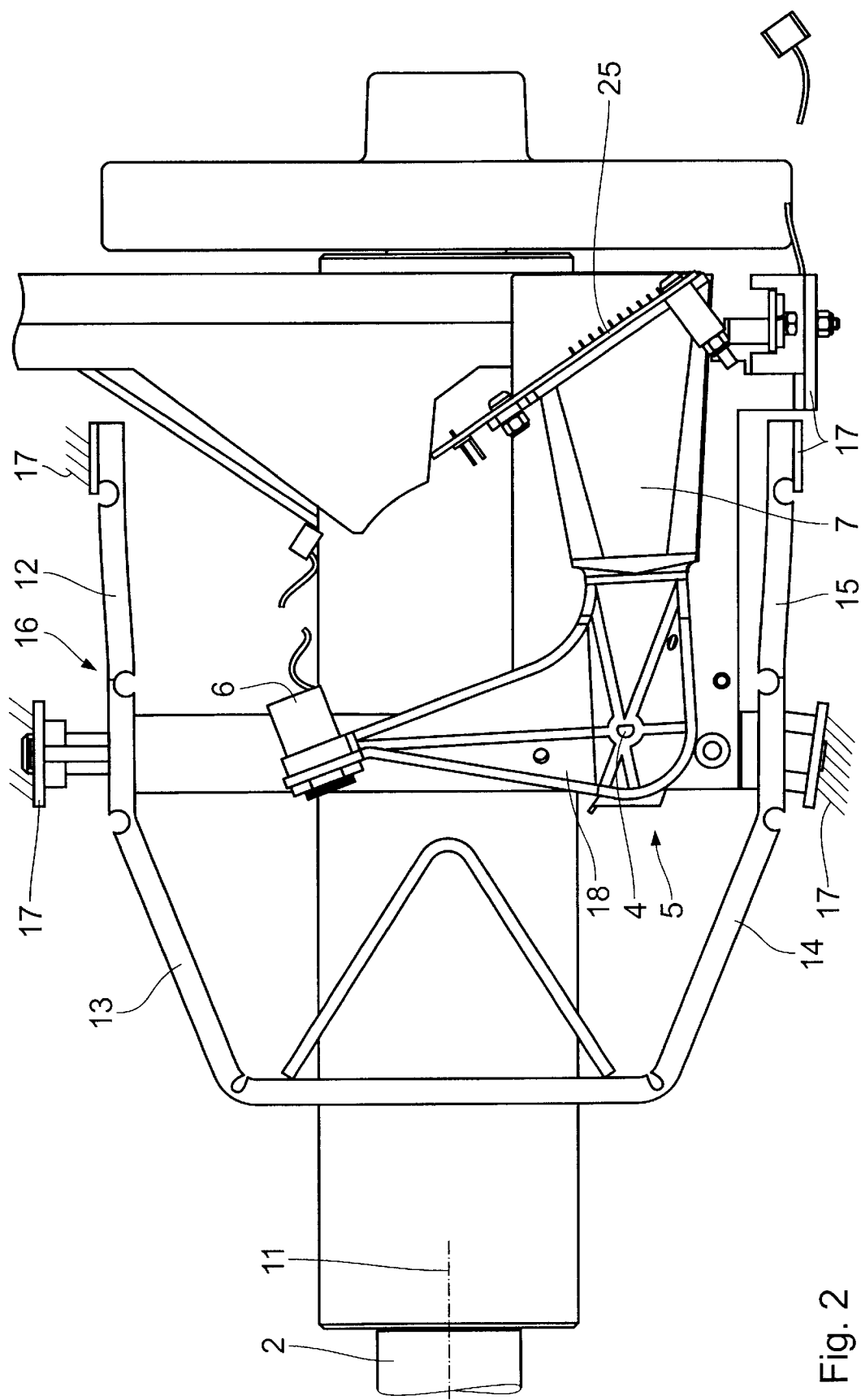
FIG. 2 shows the scanning apparatus illustrated in FIG. 1, installed at the underside of a force-measuring device of a balancing machine, as a view from below.
Figure 3:
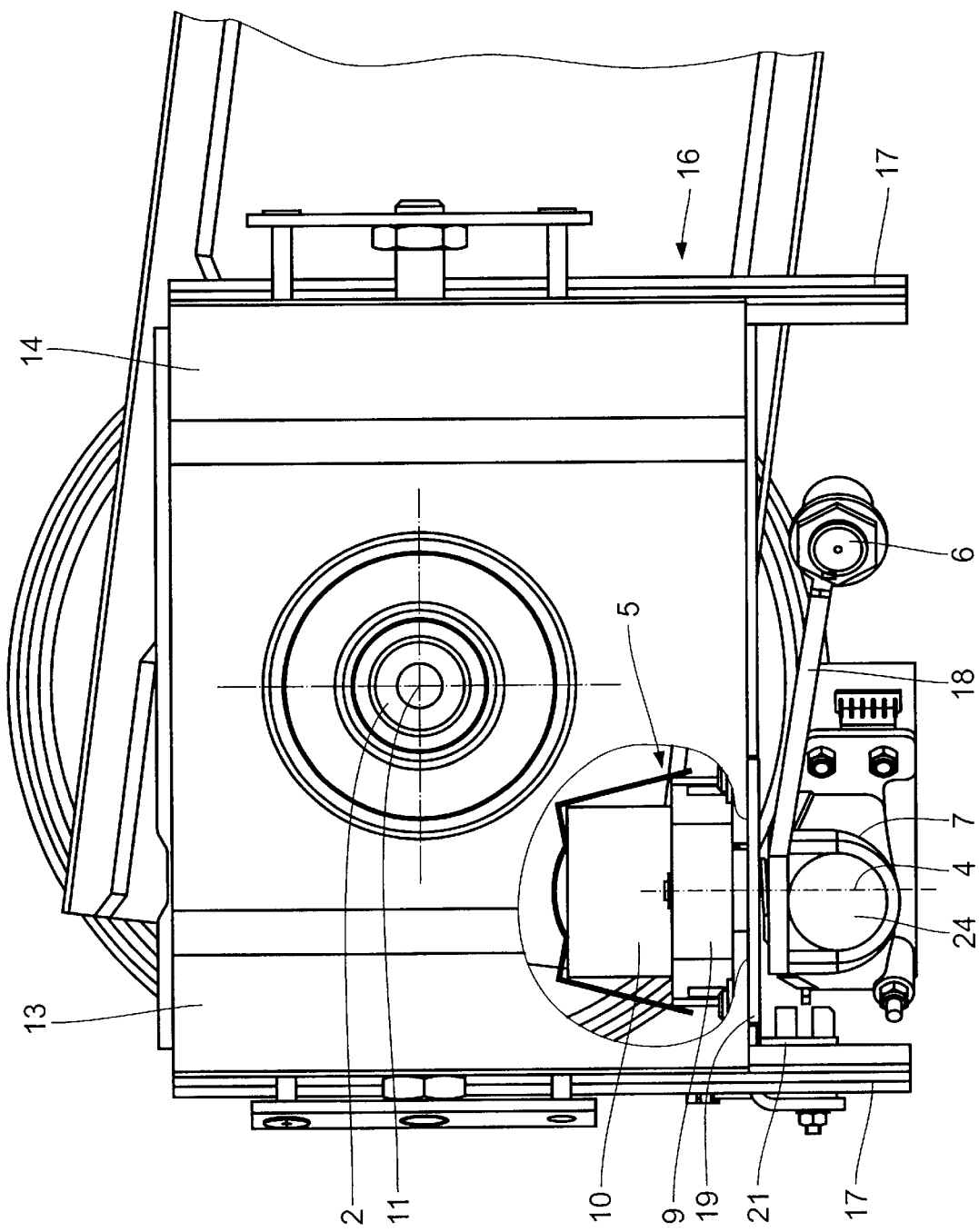
FIG. 3 shows the structure illustrated in FIGS. 1 and 2 viewed from the front in the axial direction of a measurement shaft of the balancing machine.

Referring now also to FIGS. 2 and 3 a motor vehicle wheel 1 to be balanced is fixed in the usual manner by suitable mounting means (not shown) on a measurement shaft which is indicated at 2 in FIGS. 2 and 3 of a balancing machine of which FIGS. 2 and 3 shown the region of a force-measuring device generally indicated at 16. The vehicle wheel 1 to be balanced is fixed in position centrally so that the axis of the wheel as indicated at 3 in FIG. 1 and the axis of the measurement shaft 2, as indicated at 11 in FIGS. 2 and 3, extend coaxially when the vehicle wheel is fixed to the measurement shaft 2 for an unbalance measuring operation.

The force-measuring device 16 can be of the usual known structure as is to be found in WO 00/14503 (DE 198 44 975 A1). For that purpose the force measuring device has support plates 12 through 15 which are hingedly connected together and which extend substantially in a vertical direction. That measuring assembly forms virtual mounting locations for the measurement shaft 2 on the frame structure indicated at 17 of the balancing machine. The machine further includes force sensors or pick-up devices (not shown) for measuring centrifugal forces corresponding to unbalance of the wheel to be balanced, the measured values from the force sensors or pick-up devices being evaluated by the usual evaluation procedure in an electronic evaluation system diagrammatically indicated at 8 in FIG. 1 for unbalance-compensating purposes.

For the purposes of optimising the unbalance-compensating procedure, it is possible by means of the illustrated apparatus to precisely ascertain the contour of the inside of the wheel rim 22, which faces towards the axis 3 of the wheel, and also the contour of the radial wheel disk portion 23. The position of spokes or radially extending arms, in particular the angular positions of the associated base points thereof in the region of the axis of the wheel, can also be ascertained or the radial wheel disk portion 23.

For that purpose, and referring again to FIG. 1, respective locations on the vehicle wheel and in particular the inside of the vehicle wheel are scanned by the light beam emitted by the light source 6. The beam which is reflected from the scanned location on the vehicle wheel is then received by the position-sensitive receiver 7. For that purpose the receiver 7 can have an optical receiver system 24 which focuses the reflected beam on to a charge-coupled device (CCD) sensor 25. That CCD sensor 25 can detect separately from each other a plurality of local maxima of a luminous intensity function. The direction of the reflected beam depends on the distance of the sensed location on the vehicle wheel, relative to the light source 6. Therefore, in dependence on that distance, the reflected beam is directed by way of the optical receiver system 24 on to a given location on the CCD sensor 25 which then supplies the evaluation electronic system 8 with a position-sensitive or position-dependent signal.

In the procedure for detecting the contour of the wheel 1, the required pivotal movement of the light source 1 and the receiver 7 is produced by a rotary drive which is diagrammatically indicated at 5 in FIGS. 2 and 3 and which includes the common carrier 18 and a stepping motor indicated at 10 in FIG. 3, together with an intermediate transmission unit which is not shown in greater detail herein. The rotary drive thus produces the synchronous pivotal movement of the beam emitted by the light source 6 and the receiver 7 about the common axis 4 in a measurement plane which intersects the rim surface of the vehicle wheel 1 at an obtuse or approximately right angle, for successive measurement steps.

Accordingly, in operation of the apparatus, the carrier 18 is pivoted through slight angular steps by means of the stepping motor 10, within the measurement plane. In that way successive points or locations on the vehicle wheel 1 are scanned and the respective spacing thereof from the light source 6 is ascertained by means of the measurement signals delivered by the CCD sensor 25.

As the pivot axis 4 about which the light source 6 and the CCD sensor 25 are pivoted is mounted stationarily to the machine frame structure 17, that provides for accurately determining the position of the respective location scanned on the vehicle wheel 1, in relation to the force-measuring device 16, in particular the measurement value sensor thereof. The measurement values ascertained can therefore be evaluated with the measurement values from the force-measuring device 16, which were ascertained in the operation of measuring unbalance of the vehicle wheel 1, to provide for an optimum balancing effect, as is described in DE 41 22 844A1.

The respective angular position of the light source 6 and the position-sensitive receiver 7 or the CCD sensor 25 thereof are detected by a rotary angle sensor 9 which can be integrated into the stepping motor 10 or which can be arranged separately therefrom. The sensor 9 thus supplies signals proportional to the respective rotary angle position of the stepping motor and those signals are supplied to the electronic evaluation system 8.

Referring now more particularly to FIG. 3, the measurement plane in which the light source 6 and the receiver 7 are arranged and pivoted is disposed beneath the force-measuring device 16 of the balancing machine.

Figure 4:
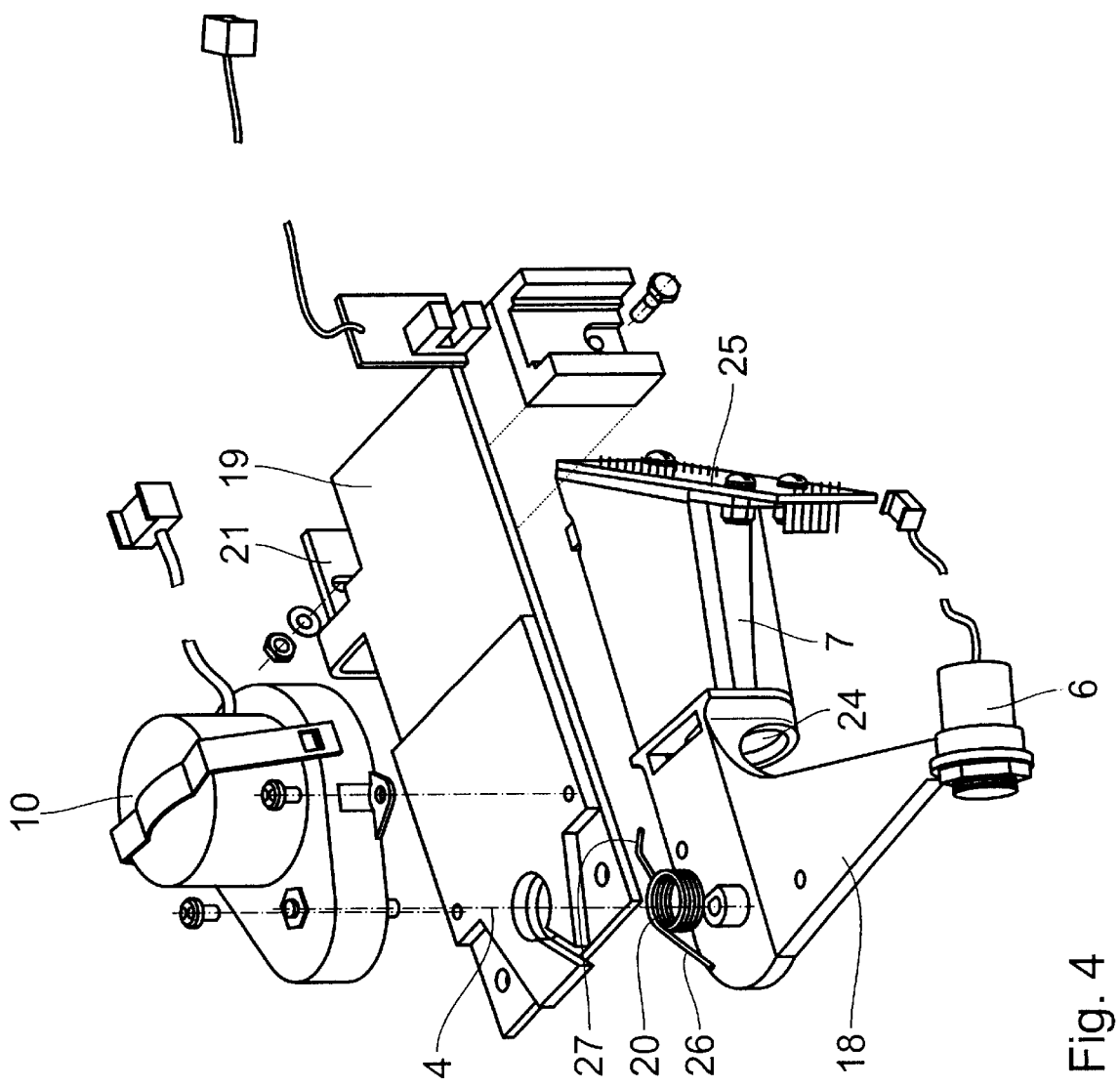
FIG. 4 is a perspective exploded view showing individual parts of the scanning apparatus.

Referring now additionally to FIG. 4, for that purpose, the carrier 18 which, as indicated above, is constructed in the fashion of an angle lever, is supported on a carrier plate 19 pivotably about the pivot axis 4 against the biasing force of a coil spring 20. The carrier plate 19 is fixed by way of an angled fixing plate 21 to the frame structure 17 of the balancing machine, for example by means of a suitable screw connection. In order to arrange the stepping motor 10 in such a fashion as to save space, it can be disposed in the assembly of the force-measuring device 16, which is formed by the support plates 12 through 15.

It will be noted that in FIG. 3, it is possible to view the arrangement of the stepping motor 10, through the broken-away support plate.

The light source 6 and the position-sensitive receiver 7 are biased into a rest position by the spring 20 having spring legs 26 and 27 which bear against the carrier plate 19 and the carrier 18 respectively. In that rest position, the light source 16 or the light beam emitted thereby is directed on to a central region of the vehicle wheel 1, in the proximity of the wheel axis 3. When the apparatus is used fir scanning the inside surface of the vehicle wheel 1 therefore, the sensing light beam which is emitted from the light source 6 is pivoted from the inside, that is to say a position in the proximity of the wheel axis 3, outwardly, that is to say in a direction towards the periphery of the wheel 1, against the biasing force of the spring 20, by virtue of the drive action of the stepping motor 10.

The illustrated apparatus can also be used to detect lateral deflections in the axial direction of the wheel of the scanned locations on the wheel, in particular the wheel locations which are on the radius being scanned.

It will be appreciated that the above-described method and apparatus according to the invention have been set forth solely by way of example and illustration of the principles of the invention and that various modifications and alterations may be made therein without thereby departing from the spirit and scope of the invention.

What is claimed is:

1. A method for determining values for balancing a vehicle wheel, the method comprising:

mounting the vehicle wheel with its horizontal axis on a shaft of a balancing machine such that an unbalance-measuring procedure and a balancing operation can be carried out;

sensing locations on the vehicle wheel using a light beam emitted by a light source and reflected to a position-sensitive receiver, wherein the light source and the position-sensitive receiver are pivoted synchronously about a common axis in a measurement plane and directions of the emitted light beam and the reflected light beam are moved within the measurement plane, wherein the measurement plane extends below said shaft and intersects an inner rim surface of the vehicle wheel at an approximately right angle or an obtuse angle;

measuring the spacings of the sensed locations relative to a stationary reference location of the balancing machine during successive measuring steps, wherein measuring is from the reactions of the emitted beam and the reflected beam; and evaluating the values for balancing the vehicle wheel from the measured values of said spacings and the measured values ascertained by the unbalance-measuring procedure.

2. A method as set forth in claim 1, wherein said angle is an obtuse angle.

3. A method as set forth in claim 1, wherein the successive measurement steps are carried out in a measurement plane which extends outside the axis of the wheel and parallel to the axis of the wheel.

4. A method as set forth in claim 1, wherein the axis of the wheel is arranged horizontally and the successive measurement steps are carried out in a measurement plane which extends below the axis of the wheel.

5. A method as set forth in claim 4
wherein the successive measurement steps are carried in a horizontally extending measurement plane.

6. A method as set forth in claim 1, wherein the emitted beam is further used to sense a radially extending region of the wheel disk portion.

7. A method as set forth in claim 6
wherein the emitted beam is further used for determining angular positions of base points of spokes extending radially, from a central part of the wheel disk portion.

8. A method as set forth in claim 1, wherein the wheel is rotating lateral displacement in the axial direction of the sensed locations of the wheel which are on a given radius are ascertained, and wherein the emitted beam is emitted at least during one revolution of the wheel in the direction corresponding to the given radius.

9. A method as set forth in claim 1, wherein in the scanning procedure firstly a location on the wheel which is closer to the axis of the wheel is sensed with the emitted beam and then the emitted beam is pivoted towards the periphery of the wheel.

10. A method as set forth in claim 1, wherein the spacing of the sensed location relative to the reference location is determined from the measurement signals of the position-sensitive receiver by means of one-dimensional triangulation and from the respective rotary angle position of the emitted beam and the beam reflected by the sensed location.

11. A method as set forth in claim 1, wherein after a wheel unbalance measurement procedure has been carried out the emitted beam is directed on to the balancing location on the wheel at which unbalance compensation is to be effected.

12. An apparatus for determining values for balancing a vehicle wheel, the apparatus comprising:
 a horizontally arranged measurement shaft attached to a balancing machine;
 mounting means for mounting the vehicle wheel to the shaft for rotation about a wheel axis;
 a light source operable to direct an emitted light beam onto a location on the vehicle wheel;
 a position-sensitive receiver operable to receive a beam reflected by the sensed location on th vehicle wheel;
 means for carrying the light source and the receiver pivotably in a plane beneath the measurement shaft;
 a rotary drive including a stepping motor for synchronous pivotal movement of the light source and the receiver about a common pivot axis;
 an electronic evaluation system operable to evaluate measurement values of the position sensitive receiver for ascertaining the spacing of the location on the vehicle wheel which is sensed by the light source from a reference location on the balancing machine,
 a rotary angle sensor operable to supply a signal proportional to a respective rotary angle position of the stepping motor to the evaluation system, and
 a force measuring device operable to supply signals proportional to an unbalance of the vehicle wheel to the evaluation system,
 wherein said evaluation system is operable to evaluate the values for balancing the vehicle wheel from the values of said spacings and said signals proportional to the unbalance of the vehicle wheel.

13. Apparatus as set forth in claim 12, wherein the measurement shaft is arranged horizontally, and further including means carrying the light source and the receiver pivotably in a plane beneath the measurement shaft.

14. Apparatus as set forth in claim 12, wherein the pivot axis extends perpendicularly to the axis of the measurement shaft.

15. Apparatus as set forth in claim 14
wherein the pivot axis is outside the measurement shaft axis.

16. Apparatus as set forth in claim 12, wherein the measurement shaft is supported on a frame by way of pivotably interconnected support plates of a force measuring device, and wherein the stepping motor is arranged between the support plates and the light source and the receiver is arranged beneath the support plates.

17. Apparatus as set forth in claim 12, including means biasing the light source and the receiver towards a rest position.

18. A method of optically scanning a vehicle wheel, wherein
 sensing location on the wheel by means of a light beam emitted by a light source and reflected to a position-sensitive receiver;
 measuring the spacing of the sensed location relative to a reference location from the directions of the emitted beam and the reflected beam;
 pivoting the emitted beam and the position-sensitive receiver synchronously about a common axis in a measurement plane which intersects the rim surface of the wheel at an approximately right angle, for successive measurement steps; and
 directing the emitted on to the balancing location on the wheel at which unbalance compensation is to be effected after a wheel unbalance measurement procedure.

19. Apparatus for optically scanning a vehicle wheel to be balanced comprising
 a measurement shaft supported on a frame by way of pivotably interconnected support plates of a force measuring device;
 mounting means for mounting the wheel to the shaft for rotation about a wheel axis,
 a light source operable to direct an emitted light beam on to a location on the wheel, the light source arranged beneath the support plates;
 a position-sensitive receiver operable to receive a beam reflected by the sensed location on the wheel, the position-sensitive receiver arranged beneath the support plates;
 a rotary drive including a stepping motor for synchronous pivotal movement of the light source and the receiver about a common pivot axis, wherein the stepping motor is arranged between the support plates;
 an electronic evaluation system operable to evaluate measurement values of the position-sensitive receiver for ascertaining the spacing of the location on the vehicle wheel which is sensed by the light source from a reference location; and
 rotary angle sensor operable to supply a signal proportional to the respective rotary angle position of the stepping motor to the evaluation system.

20. Apparatus for optically scanning a vehicle wheel to be balanced comprising
 a measurement shaft,
 mounting means for mounting the wheel to the shaft for rotation about a wheel axis;
 a light source operable to direct an emitted light beam on to a location on the wheel,
 a position-sensitive receiver operable to receive a beam reflected by the sensed location on the wheel;
 means biasing the light source and the receiver towards a rest position;
 a rotary drive including a stepping motor for synchronous pivotal movement of the light source and the receiver about a common pivot axis;

an electronic evaluation system operable to evaluate measurement values of the position-sensitive receiver for ascertaining the spacing of the location on the vehicle wheel which is sensed by the light source from a reference location; and a rotary angle sensor operable to supply a signal proportional to the respective rotary angle position of the stepping motor to the evaluation system.

* * * * *